(12) United States Patent
Hermann et al.

(10) Patent No.: US 6,732,118 B2
(45) Date of Patent: May 4, 2004

(54) METHOD, COMPUTER SYSTEM, AND COMPUTER PROGRAM PRODUCT FOR MONITORING OBJECTS OF AN INFORMATION TECHNOLOGY ENVIRONMENT (75) Inventors: Alfred Hermann, Weil der Stadt (DE); Bernd Gutjahr, Ostelsheim (DE); Peter Klotz, Fellbach (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 341 days.

(21) Appl. No.: 09/817,486

(22) Filed: Mar. 26, 2001

(65) Prior Publication Data
US 2002/0143788 A1 Oct. 3, 2002

(51) Int. Cl.⁷ .............................................. G06F 17/30
(52) U.S. Cl. ........................ 707/103; 707/101; 707/102; 707/10
(58) Field of Search .............................. 707/9, 10, 103, 707/101, 102; 709/204

(56) References Cited
U.S. PATENT DOCUMENTS

| | | | |
|---|---|---|---|
| 6,061,724 A | | 5/2000 | Ries et al. |
| 6,094,657 A | * | 7/2000 | Hailpern et al. ............. 707/103 |
| 6,212,436 B1 | * | 4/2001 | Marple et al. ................ 700/10 |
| 6,292,803 B1 | * | 9/2001 | Richardson et al. ........ 707/102 |
| 6,418,445 B1 | * | 7/2002 | Moerbeek ............... 707/103 X |
| 6,438,549 B1 | * | 8/2002 | Aldred et al. ................... 707/9 |
| 6,539,397 B1 | * | 3/2003 | Doan et al. ................. 707/103 |
| 6,654,759 B1 | * | 11/2003 | Brunet et al. ............... 707/101 |
| 2002/0138571 A1 | * | 9/2002 | Trinon et al. ............... 709/204 |

FOREIGN PATENT DOCUMENTS

| | | |
|---|---|---|
| EP | 0 553 285 B1 * | 3/2000 |
| EP | 1 043 871 A2 | 10/2000 |
| EP | 1403971 A2 | 10/2000 |
| WO | WO 93/10495 | 5/1993 |
| WO | 00/11885 | 3/2000 |
| WO | WO 00/11885 | 3/2000 |

OTHER PUBLICATIONS

Lipkin et al., "Method and apparatus for an improved security system mechanism in a business applications management system platform", US Patent Application Publication, Aug. 2002, pp. 1–97.*
European Search Report of European Patent Application No. 01 107 514.0 dated Sep. 21, 2001 English.
VantagePoint for Windows, Concepts Guide, HP Openview, 2000 pp. 1–79 English.

* cited by examiner

*Primary Examiner*—Thuy N. Pardo (57) ABSTRACT

The invention is directed to a method performed by a service management system for monitoring objects of an IT environment. At least some of the objects and their dependencies are represented in a service model. The method comprises that data relating to an object that is not represented in the service model is automatically processed by the service management system, and when said object is later included in the service model, the results of this processing are available for monitoring the included object. The invention is also directed to a corresponding computer system and a corresponding computer program product.

25 Claims, 6 Drawing Sheets

METHOD, COMPUTER SYSTEM, AND COMPUTER PROGRAM PRODUCT FOR MONITORING OBJECTS OF AN INFORMATION TECHNOLOGY ENVIRONMENT

FIELD OF THE INVENTION

The present invention relates generally to monitoring information technology (IT) environments, and more particularly, to a method, computer system and computer program product for monitoring objects of an IT environment.

BACKGROUND OF THE INVENTION

Nowadays, as information systems become ubiquitous, and companies and organizations of all sectors become severely dependent on their computing network and IT services, the demand for tools for monitoring IT environments increases rapidly. The class of sensitive IT services includes online transaction processing, electronic commerce, Internet/World Wide Web, data warehousing, telecommunication switches, and server applications that generally run 24 hours a day. In addition, almost all internal business processes such as electronic communication or information retrieval rely on a properly functioning IT network. These servers must run perpetually, providing a service to the employees and clients, and therefore demand a high availability as the cost of any outage can be substantial. While it is essential for companies to maintain the health of their IT services, the underlying IT environments become more and more complex and thus susceptible to failures. Not only is the number of computers within an IT network growing rapidly, i.e. the size of the network is increasing, but also the applications and services within the network are changed quite regularly as a result of frequent software upgrades, rapid technology improvements of the hardware components, new user requirements, and so on. For big companies or IT consulting companies that operate the IT infrastructure of several other companies, the number of relevant IT services may easily exceed 10,000. Such large IT networks with their dynamic environment make it impossible for administrators and operators to keep an overview over the performance of the IT services and to respond to problems without an appropriate service management tool.

Operators of complex services are often confronted with a large number of messages reporting the status and errors of the IT services. Due to the number of components of the IT environment and the complex interactions between those components, it is difficult for the operator to resolve the dependencies of the generated error messages and to track down the origin of the problem. Moreover, it is even difficult to detect the important error messages and to distinguish them from the less important messages, along with the risk of overlooking relevant messages.

In view of these problems, the present applicant offers a service management tool (HP OpenView VantagePoint for Windows™) aiming to support administrators and operators of complex network-based IT services. Although this system runs under Windows™ it is able to manage heterogeneous networks independent of the platform. A service management tool is an IT solution for managing the availability and performance of IT-based business services from the end-user's perspective. Those tools are able to detect and evaluate the performance of the servers or applications, recognise and warn the operator when a problem is about to occur and respond automatically to poor performance. They allow the user to manage individual services and all elements that depend on these services. In particular, they enable the user to build management models that represent the services and the relationships and dependencies between them. In general, the task of administrators is to set up the management model, to configure it, maintain the model configuration and to define failures and suppression criteria in order to reduce the information which is sent to the operator. The operator's primary function is then to monitor the status of a service and to troubleshoot and respond to problems using the information provided by the service management tool.

Usually, large IT environments are operated by several administrators, each one being responsible for individual parts of the network or for special services. One function of the service model is to combine the information and know-how of the different administrators and to integrate them into a single model. However, IT networks are usually highly dynamic environments in which services and network components are changing very rapidly. Handling of such dynamic environments is complex and difficult.

SUMMARY OF THE INVENTION

According to one aspect, the invention relates to a method performed by a service management system for monitoring objects of an IT environment. At least some of the objects and their dependencies are represented in a service model. The method comprises that data relating to an object that is not represented in the service model is automatically processed by the service management system and, when said object is later included in the service model, the results of this processing are available for monitoring the included object.

According to an other aspect, the invention relates to a computer system comprising a service management system for monitoring objects of an IT environment. At least some of the objects and their dependencies are represented in a service model. The computer system comprises that data relating to an object that is not represented in the service model is automatically processed by the service management system and, when said object is later included in the service model, the results of this processing are available for monitoring the included object.

According to still another aspect, the invention is directed to a computer program product including program code for carrying out a method when executed on a computer system. The method is performed by a service management system for monitoring objects of an IT environment. At least some of the objects and their dependencies is represented in a service model. The method comprises that data relating to an object that is not represented in the service model is automatically processed by the service management system and, when said object is later included in the service model, the results of this processing are available for monitoring the included object.

Other features are inherent in the disclosed method and computer system or will become apparent to those skilled in the art from the following detailed description of embodiments and the accompanying drawings.

DETAILED DESCRIPTION OF THE PREFERRED EMBODIMENTS

Figure 1:
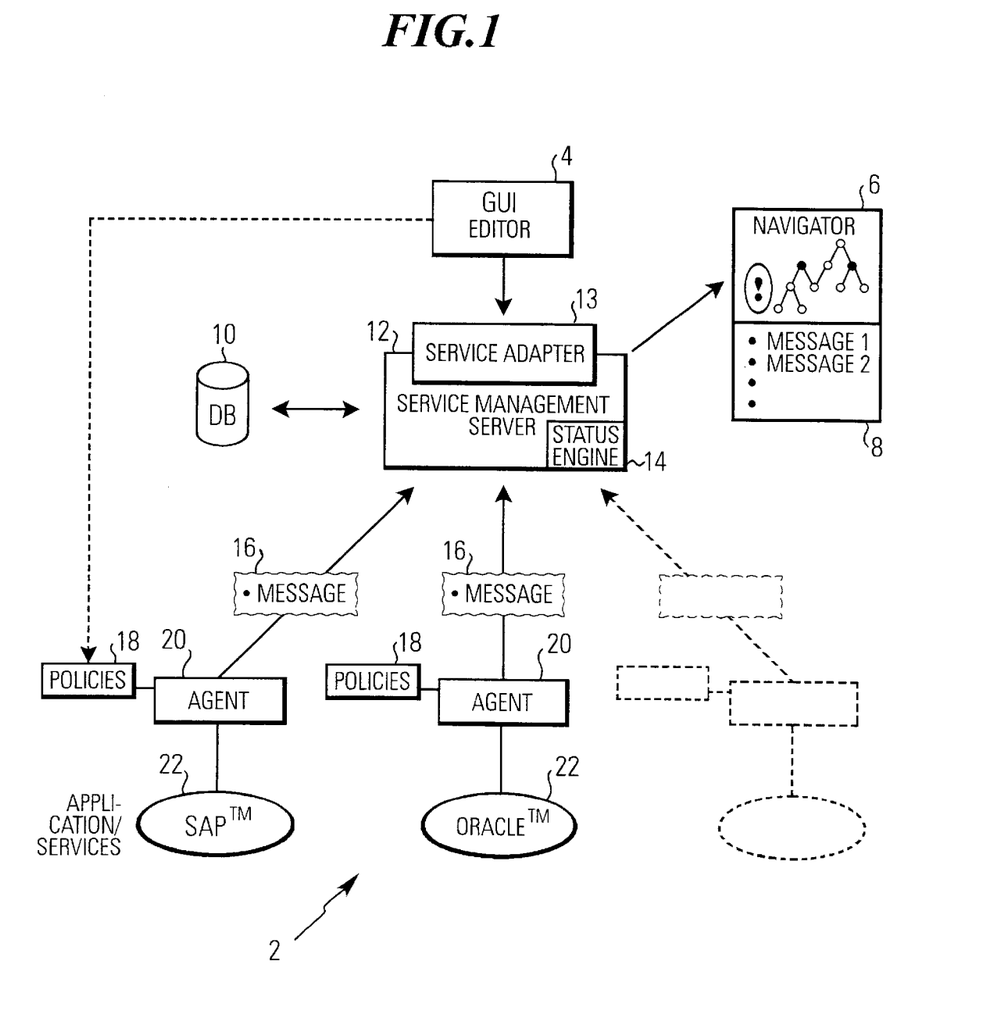
FIG. 1 shows a high level architecture of a service management system.

In FIG. 1 the general high level architecture of a service management system is depicted. Before proceeding further with the description, however, a few items will be discussed.

In general, the purpose of a company's IT environment is to offer services to its employees and customers. Services for employees, for instance, include a facility for exchanging electronic mails or for accessing electronic data bases. The company's web page is an example of an IT service provided to customers. In addition, an IT network comprises a number of different hardware components, such as computers, switches, routers, servers, storage disks, displays, etc., usually referred to as nodes of the network. On the other hand, most nodes can be understood as services in the wider sense that they provide some functionality to the IT network. Therefore services in this context range from low-level network components, such as nodes, to software applications, such as Microsoft™ Office or an Oracle™ database, and from hardware-based services, such as printing or displaying capabilities, up to abstract high-level services, such as the marketing department that itself uses various other IT services. Those different kinds of services comprise one or more hardware or software components within the computing environment. Most services are, in fact, an aggregation of applications and computer systems. Any such components of the IT environment are referred to below as "objects".

Most services are not stand-alone applications but require the availability of other services. For instance, the high-level service Microsoft™ Office for a desktop computer requires that Microsoft™ applications, such as Excel, Access, Word, etc., are running, an e-mail service and a printing capability are available, whereas the printing capability again may rely on various printers and network components. In other words, the objects of the network depend on each other whereas usually a certain hierarchy exists between the various objects. These dependencies are represented in a so-called service model.

The term "message" refers to a structured modification that is generated as a result of an event within the network. Typically, an event represents a fault or an operation problem, but it can also be a change in an application system or service status. Generally, messages reporting basically the status of the object that has triggered the event are received by the service management system. For example, when the printer's paper tray is empty the printer status changes. This results in an event that creates a message notifying the service management system of the printer's new status.

The status of an object can take different severity levels. The severity level indicates the impact of an event or a message associated with an object on the performance of the object. In the preferred embodiments typical severities of objects or messages associated with objects are "normal", "warning", "minor", "major" or "critical".

Typically, an administrator of a company that decides to use a service management system for monitoring its IT environment starts to model first the core of the network comprising the most important services rather than modelling the complete environment all at once. IT networks are usually too complex to be handled by only one administrator so that different parts of the network might be modelled by different people. The various parts are subsequently integrated into the service model. Modelling the service model is part of the administrator's task and basically means collecting the object to be integrated into the service model and manually defining the dependencies between other objects of the network. This process is time-consuming and requires specific knowledge of the corresponding network object to be modelled. Therefore, building a service model of the IT infrastructure is a continuously on-going process over a long-term period rather than a job completed all at once. In addition, the structure of an IT environment and its objects is highly dynamic, i.e. changes are very likely. Therefore, building and maintaining a service model requires continuous interaction by the administrators. As a consequence, only a part of the IT environment is represented in the current service model and other objects are not or not yet represented in the model.

Furthermore the messages reporting the status of objects are used to update the status of the service model. However, it is advantageous also to process messages relating to objects that are not represented in the service model, as it is very likely that these objects are included later in the service model allowing the results of this processing to be used immediately. Basically there are two aspects: first, the status information carried by the messages is directly available in case the object is included in the service model to improve the performance of the integration of new objects. In particular, as in the prior art, a reboot of the system was required along with a very time-consuming, complete recompilation of the service model. Secondly, this precaution guarantees that all previous status information is considered if the object is integrated in the model.

The automatic processing of data relating to an object that is not represented in the service model is advantageous since the current status of those objects is available immediately when needed for the integration of the considered object, for example, after a restart of the system. Otherwise, it would be necessary either to perform a time-consuming search through an archive for old messages concerning the object in question in order to reconstruct the actual status of the object, or to use a default status for the object. However, the automatic processing is most advantageous when the service model is updated dynamically during runtime of the service management system, as in the preferred embodiments. In this case, the service management system is configured so as to dynamically include new objects in the service model during runtime. As the results of the automatic processing are directly available, there is no significant time delay between the integration of the object in the service model and the provision of its status. In other words, the administrator is able to observe immediately the status of the newly included object.

In the preferred embodiments the availability and the proper-functioning of the object is represented in the service model by the status that can take severity levels from "normal" to "critical". This status is calculated based on status information carried by messages relating to the corresponding object and on the status of other depending objects of the service model. The rules defining how the status of an object is derived from the statuses of other depending objects are modelled in the service model.

The automatic processing of data relating to an object that is not represented in the service model comprises in particular the collection of messages from the IT environment reporting the status of the object considered. In the preferred embodiments the processing also comprises the evaluation of the reported status information. This means that the information is not only recorded but it is also classified according to the different severity levels and the distribution of the status messages with respect to the severity levels is calculated. This statistical information is then available to the administrator for monitoring the object when it is later included in the service model. This pre-processed information is most preferably used for calculating the status of other objects of the service model that depend on the object considered. This implies in the most preferred embodiments that instead of updating the complete service model, only those parts of the service model that are affected by the newly included object have to be recalculated, making the process of integrating new objects into the service model very effective.

Service management systems in the prior art require the checking of a database for former messages in order to determine the current status of the included object. In contrast thereto, the preferred embodiments avoid the time-consuming search through the archive of messages since the status information is available at any time, thus avoiding the risk of losing previous status information.

In the preferred embodiments, the service model, and in particular the dependencies between the objects of the service model, are depicted in a graphical user interface. In addition, the status and status changes of the objects are optically visualised most preferably in a two-dimensional map giving the user a clear view of the relations between the various objects.

In general, objects that are part of the IT environment but which have not yet been integrated into the service model are identified by messages relating to those objects. In this way, dependencies on other objects of the network cannot be recognised. Therefore, in the preferred embodiments, objects of at least a part of the environment and their relationship to each other are detected automatically by the service management system supporting the administrator in modelling the service model.

The preferred embodiments of the computer program product comprise a program code which, for example, is stored on a computer readable data carrier or is in the form of signals transmitted over a computer network. The preferred embodiments of the program code are written in an object-oriented programming language, such as C++. Some of the components of the service management system also have a hardware part. For example, the storage components 24 of FIG. 2 comprise a physical storage medium for continuously storing collected data. It is clear that a computer program product comprises only the software parts of these components.

FIG. 1 shows a high-level architecture of a service management system 2 and its components in the preferred embodiments. Applications, services and nodes 22, referred to below as objects of the IT environment, such as SAP™ or Oracle™, are each monitored by individual agents 20. The services can be located on different platforms with different operating systems forming a heterogeneous environment. These agents 20 receive event notifications and collect performance data from the network object 22. They handle these event notifications and performance data according to instructions from policies 18 that are defined by a user via a graphical user interface (GUI) 4. In response, messages 16 are sent by the agents 20 to a service management server 12, and in particular, to a status engine 14. The service management server 12 stores the messages in a database 10, processes the content of the messages according to a service model provided by a service adapter 13 and sends the results to a navigator 6 and a message browser 8. The navigator 6 displays a two-dimensional service map illustrating the service model and the status of the objects that are integrated in the service model. In the message browser 8 the relevant messages are displayed and can be manipulated by the user. The GUI 4 comprises several purposes: it allows the user to edit i) the policies 18 of the agents 20, ii) rules for the status engine how to process the status of the messages 16, and iii) builds the service model defining the objects of the IT network and its dependencies. The service adapter 13 serves as the interface between the user and the status engine 14 by storing and providing the service model and its objects, as well as objects that are not yet included in the service model, together with the corresponding status information. Communication between the various components of the server management system is implemented based on the web-based enterprise management (WBEM) standard, and in particular on Windows platforms, on the Windows management interface (WMI).

Figure 2:
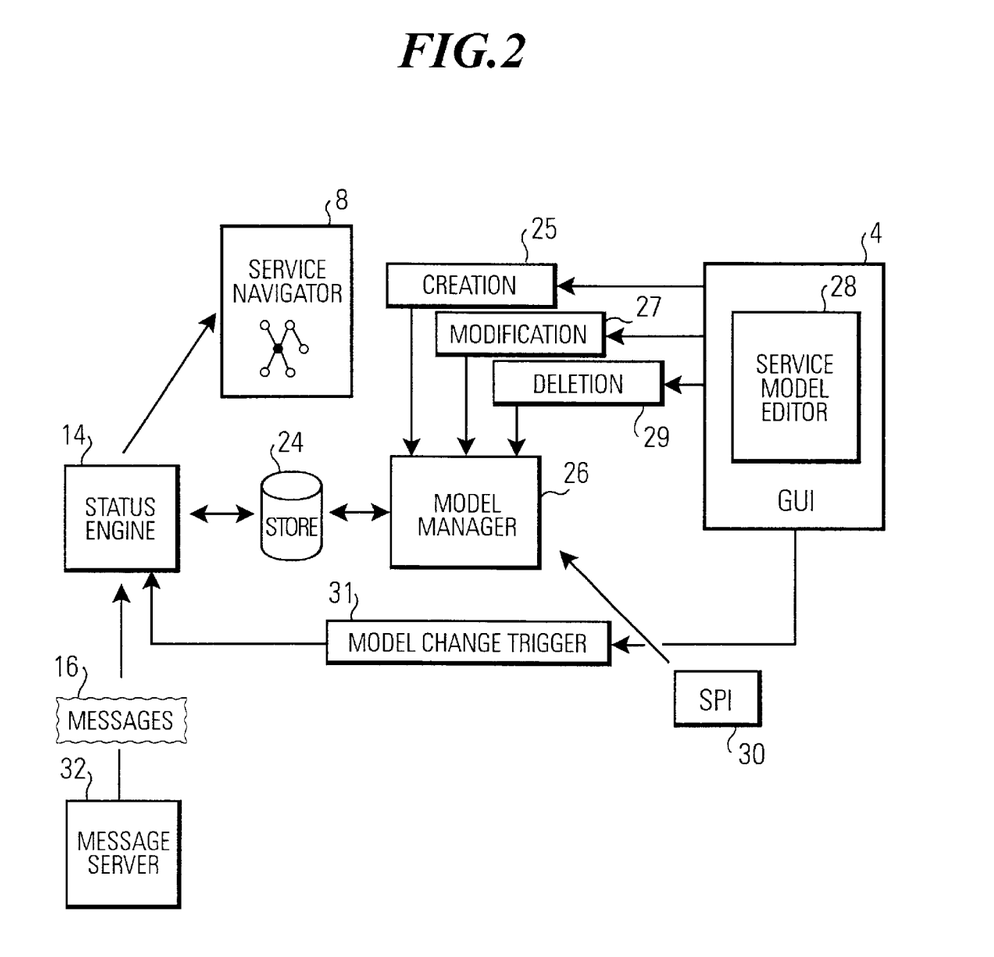
FIG. 2 schematically shows the core components of the service management system.

FIG. 2 provides a closer view of the service adapter 13 and its related components. The GUI 4 and in particular, a service model editor 28 allow the user to specify objects that are to be integrated into the service model and to define the dependencies between the various objects of the network for the calculation of their status. In particular, the administrator is able to create new objects (25) of the service model, to modify (27) existing objects or to remove (29) objects from the current service model. A SPI (Smart Plug-In) 30 supports the administrator in creating the service model by providing parts of the service model for specific type of objects or even complete parts of the network, for example for specific business applications, operating systems or services, such as SAP™, Oracle™, or Windows NT™ services. All the information concerning the service model is aggregated in a model manager 26 and stored in a storage unit 24. The storage unit 24 also holds the objects and the related status information that are not yet included in the service model. The administrator has access to the stored model at any time via the service model editor 28 in order to perform changes, updates or improvements (27) of the service model and in particular, to integrate new objects (25) into the service model. The administrator is able to cause (31) the status engine 14 to adapt to the performed changes by importing the new model from the model manager 26 and storage unit 24 respectively. A message server 32 is responsible for forwarding the messages 16 created by the agent 20 to the status engine 14. These messages comprise both messages relating to objects of the service model and messages relating to objects that are not yet part of the service model. In the status engine 14 the event notifications from a variety of messages are consolidated. For example, duplicated messages are eliminated. The severity information associated with the messages 16 is then used by the status engine 14 for the status calculation of both objects of the service model and objects that are not yet integrated into the service model. The model manager 26 provides the status engine 14 with the necessary information about the current service model comprising current objects and their relations to each other. The results of the status calculations are displayed in the navigator 8 illustrating the service model, the status and the status changes of the objects of the network in a two-dimensional service map.

Figure 3:
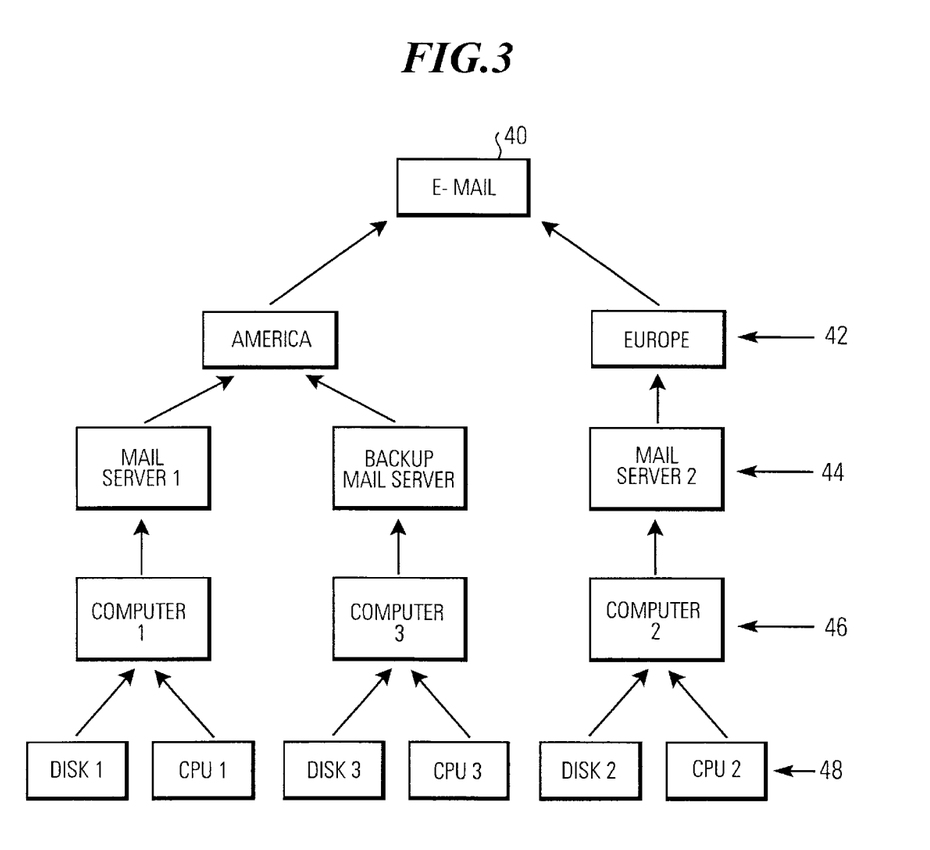
FIG. 3 schematically depicts a service hierarchy.

As an example of the dependencies between objects of an IT network, FIG. 3 depicts a service model for an e-mail service. The dependency relationships between the services are illustrated by the arrows in the drawings. The top level service is e-mail 40. This service is dependent on two lower level services 42, America and Europe, which in this case represent e-mail services on two different continents. These services again are dependent on other services, such as e-mail servers 44 and computers 46 down to the lowest level services 48.

Figure 4:
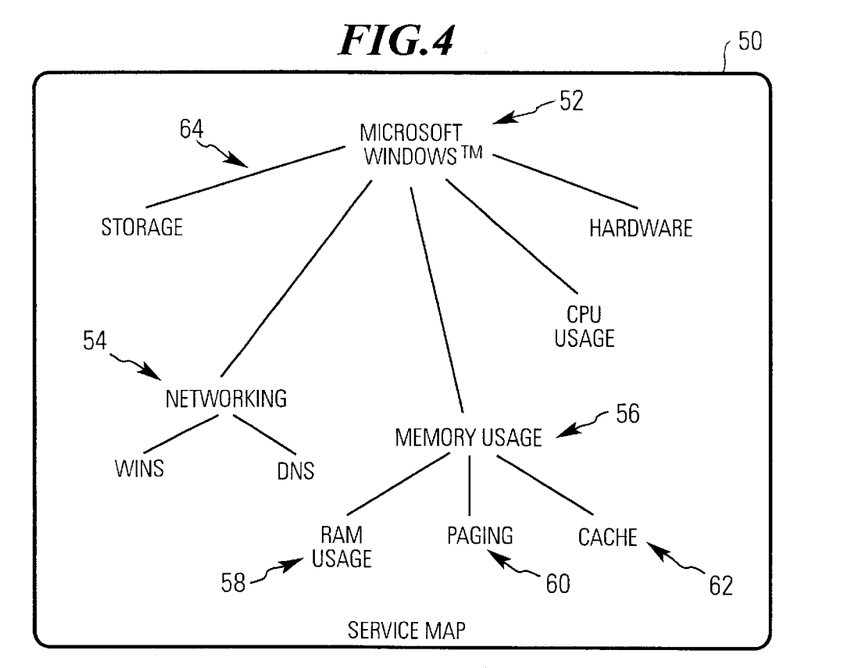
FIG. 4 shows an example of a service map.

For the preferred embodiments FIG. 4 shows another example for a service model as it is displayed in a two-dimensional service map 50. In this case Microsoft Windows™ 52 is chosen as the root service and is dependent on other services, such as networking 54, memory usage 56 and others. The services 54 and 56 are, in turn, dependent on other services on a lower level, such as RAM usage 58, paging 60 and cache 62. The dependency relations between the objects of the service model are illustrated by a line 64 connecting the corresponding objects.

Figure 5:
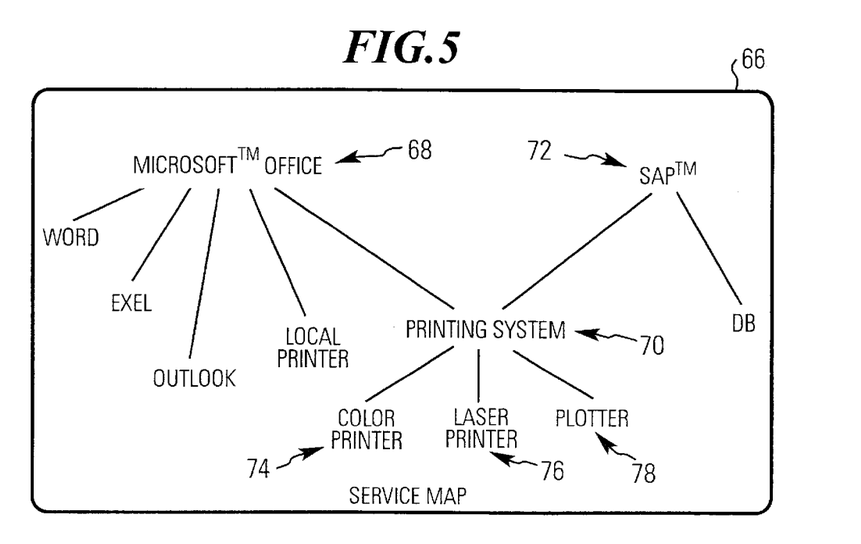
FIG. 5 shows an example of a service map.

An example of a more complex service network is depicted in FIG. 5 as a two-dimensional service map 66. The service Microsoft™ Office depends among others on a printing system 70 which again depends on other objects of the IT network, such as a colour printer 74, a laser printer 76 and a plotter 78. There is also another higher level service SAP™ 72 with regard to the printing system 70. In this case, the printing system 70 has two relations to higher-level services of the IT network. In the service map of the preferred embodiments the status and changes of the status are visually highlighted. For instance, different colours of the displayed objects of the network correspond to different severity levels ranging from "normal" to "critical". The changing of the status of an object may be highlighted by a flashing display of the corresponding object.

Figure 6:
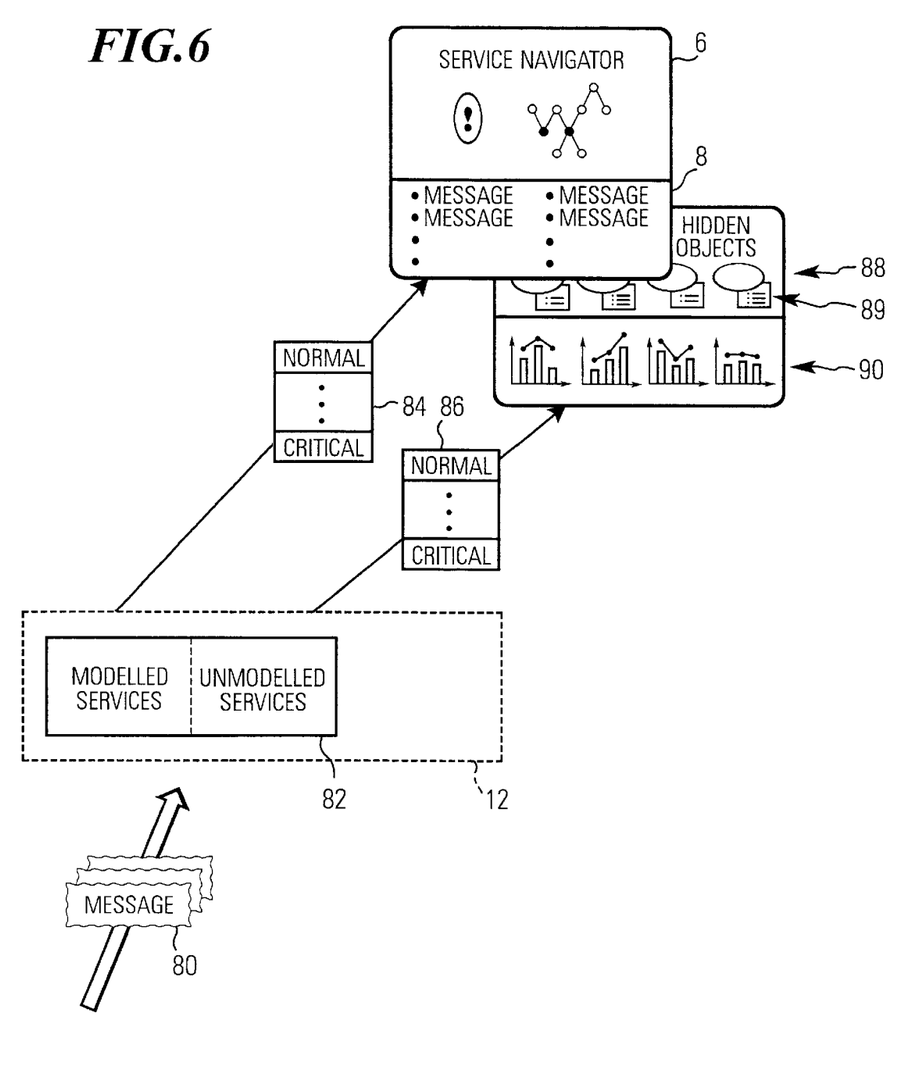
FIG. 6 illustrates the automatic processing of messages.

FIG. 6 illustrates the processing of the status information contained in messages 80. The messages 80 coming from the objects of the network to the management server 12 are analysed in an analysing unit 82 of the service management server 12. The status of those messages that are related to network objects that are modelled in the service model are queued until the next status update of the service model. In the preferred embodiments the status can take the values "normal", "warning", "minor", "major" and "critical". After a certain number of messages relating to objects of the service model have arrived in the queue or after a certain time period has passed, the status engine is triggered to recalculate the status of the objects of the service model. Finally, a status information 84 of each object of the service model is transferred to the service navigator 6 where it is displayed most preferably using a certain colour scheme for visualising different severity levels of the status of the objects and status changes. Accordingly, the messages relating to objects of the service model are displayed in the message browser 8. Due to the multiple dependencies between the objects of the service model, the update of the service model can be a very time-consuming effort performed by the status engine. Instead of recalculating the status of the service model each time a new status of one of the objects is reported, several status changes are aggregated by keeping the information in a queue for a certain time. In this way an optimal trade-off between actuality of the service model and computing time is achieved in the preferred embodiments.

On the other hand, messages regarding objects that are not included in the service model are treated differently by the analysing units 82. When a message relating to an object that is not known to the service model arrives at the analysing unit 82, a new so-called "hidden" object 88 is created and stored in the storage unit 24. Lists 89, associated with each of those "hidden" objects, that are intended to collect later the status information of the "hidden" object, are created and stored together with the corresponding "hidden" object. Those messages are then associated to the "hidden" objects 88 and their status information is stored accordingly in the list 89. However, status information 86 of those objects is stored invisibly for the administrator. Those messages themselves are not stored in the storage unit 24 but are archived together with the other messages in the database 10.

The identification of a given message with its corresponding objects is performed by a hierarchical name scheme identifying the source and origin of the message. For instance, the name server1.hp.com:database6:table_clients indicates in an hierarchical way the origin of the event that triggered the message within the network. In this case, the message relates to an object which is a table containing client information in a data base no. 6 on the HP server no. 1. The identification scheme is similar to the URL (Unified Resource Locator) identifier for web addresses. Using this identification the status information for the hidden objects 88 is recorded and associated with the corresponding objects while in the preferred embodiments the status information is statistically tracked and evaluated. For instance, distributions 90 of the frequency of the different severity levels for each object are calculated and recorded over time. This information is then directly available if the administrator decides to integrate a hidden object into the service model.

Figure 7:
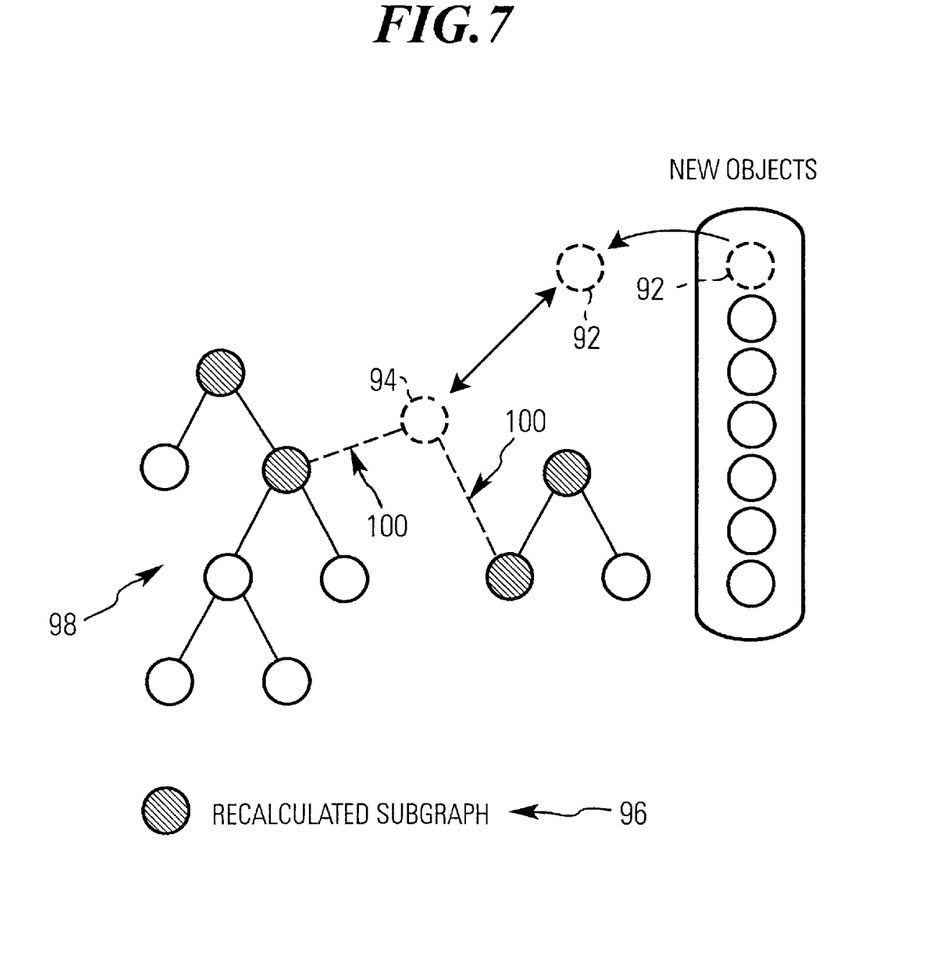
FIG. 7 illustrates the integration of new objects in a service model.

FIG. 7 depicts the integration of new objects into an existing service model. The administrator places a new object 92 at a desired position 94 within a service model 98. In addition, the administrator models dependencies 100 of the new objects 94 to the existing objects of the service model 98. Together with the integration of the new objects into the service model the corresponding status information along with its statistic evaluation is directly available.

When the status of the service model is updated only a sub-class 96 of the service model 98 has to be recalculated in the preferred embodiments, thus improving the efficiency of the updating process significantly.

Due to the software architecture of the service model it is possible to integrate new objects dynamically into the service model during system runtime. This integration is triggered by the administrator using the model change trigger 31. In response, the status engine 14 imports the updated service model using the interface to the model manager 26 and storage unit 24 respectively.

In the preferred embodiments the dynamic extensibility of the service model is realised by implementing the network of objects as connected lists of objects. This software representation of the model allows new objects to be added to the lists and new connections to be built between the objects without the need for a recompilation of the complete model. The service model is most preferably implemented in an object-oriented programming language, such as C++.

Generally, in the disclosed embodiments, service objects can be integrated in the service model during runtime. The automatic processing of data from service objects that are not yet represented in the service model allows for effective recalculation of the service model after the integration of those objects. All the information relating to those objects is directly available without delay, for instance, due to long startup times of the system. Therefore the method helps to minimise time delays during the monitoring process improving the overall system performance. Moreover, since data relating to those objects is stored in the service management system, the risk of omitting messages and information concerning those objects is reduced leading to an increased reliability of the monitoring system.

Thus, a general purpose of the disclosed embodiments is to improve the performance of a service management system by automatically processing data relating to objects that are not yet represented in the service model and to provide the results of this processing for monitoring the objects when they are later included in the service model.

All publications and existing systems mentioned in this specification are herein incorporated by reference.

Although certain methods, systems and products constructed in accordance with the teaching of the invention have been described herein, the scope of protection of this patent is not limited thereto. On the contrary, this patent covers all embodiments of the teachings of the invention fairly falling within the scope of the appended claims either literally or as a doctrine of equivalence.

What is claimed is:

1. A method performed by a service management system comprising monitoring hierarchically dependent objects of an IT environment, at least some of the monitored objects being represented in a service model that models the hierarchical dependencies between the objects, but one or more other monitored objects, at least initially, being not represented in the service model, wherein the monitoring includes collecting and processing status messages relating to monitored objects to provide statuses of the monitored objects represented in the object model, the method:

collecting and evaluating status messages relating to an object that is not represented in the service model, by the service management system, when said object is later included in the service model, making available the results of this collecting and evaluating of status messages from the period previous to the inclusion of the object in the service model, and providing the status of the object when included in the service model and influencing the status of one or more other objects that depend on that object in the hierarchy of the service model.

2. The method of claim 1, further comprising:
configuring the service management system for including new objects in the service model dynamically during runtime of the service management system.

3. The method of claim 1, wherein the availability of the objects is represented in the service model by their status which is calculated based on messages and based on the status of other related objects of the service model.

4. The method of claim 1, wherein, when an object that is not represented in the service model is included in the service model, the results of the automatic processing are available for monitoring said object and for calculating the status of other depending objects of the service model such that only parts of the service model have to be recalculated.

5. The method of claim 3, wherein the calculation of the status of an object that has been included in the service model does not require a time consuming access to previous messages reporting the status of the object.

6. The method of claim 1, wherein the service model and the status of the objects of the service model are visualised in a graphical user interface.

7. The method of claim 1, wherein objects and their dependencies between each other of at least a part of the IT environment are detected automatically within the IT environment.

8. A computer system comprising a service management system arranged to monitor hierarchically dependent objects of an IT environment, wherein the service management system is arranged to represent at least some of the monitored objects by a service model that models the hierarchical dependencies between the objects, however, allowing that one or more other monitored objects, at least initially, are not represented in the service model, wherein the monitoring includes collecting and processing status messages relating to monitored objects to provide statuses of the monitored objects represented in the object model, the service management system being arranged to collect and evaluate status messages relating to an object that is not represented in the service model, and the service management system being arranged, when said object is later included in the service model, to make available the results of this collecting and evaluating of status messages from the period previous to the inclusion of the object in the service model, for providing the status of the object when included in the service model and influencing the status of one or more other objects that depend on the object in the hierarchy of the service model.

9. The computer system of claim 8, further comprising:
   means for configuring said service management system for including new objects in said service model dynamically during runtime of said service management system.

10. The computer system of claim 8, wherein the availability of said objects is represented in said service model by their status which is calculated based on messages and based on the status of other related objects of said service model.

11. The computer system of claim 10, wherein said automatically processed data relating to an object that is not represented in said service model further comprises a means for collecting messages from said IT environment reporting the status of said object.

12. The computer system of claim 11, wherein said automatically processed data relating to an object that is not represented in said service model further comprises a means for evaluating the status information from the messages from said IT environment.

13. The computer system of claim 8, wherein, when an object that is not represented in said service model is included in said service model, the results of said automatically processed data are available for monitoring said object and for calculating the status of other depending objects of said service model such that only parts of said service model have to be recalculated.

14. The computer system of claim 10, wherein the calculation of the status of an object that has been included in said service model does not require a time consuming access to previous messages reporting the status of said object.

15. The computer system of claim 8, wherein said service model and the status of said objects of said service model are visualised in a graphical user interface.

16. The computer system of claim 8, wherein objects and their dependencies between each other of at least a part of said IT environment are detected automatically within said IT environment.

17. A computer program product including program code, when executed on a computer system, for carrying out a method performed by a service management system for monitoring hierarchically dependent objects of an IT environment, the program code being arranged such that at least some of the monitored objects are represented in a service model that models the hierarchical dependencies between the objects, however, allowing that one or more other monitored objects, at least initially, are not represented in the service model, the program code being arranged such that the monitoring includes collecting and processing status messages relating to monitored objects to provide statuses of the monitored objects represented in the object model, the program code being arranged to collect and evaluate status messages relating to an object that is not represented in the service, and, the program code being arranged, when said object is later included in the service model, to make available the results of this collecting and evaluating of status messages from the period previous to the inclusion of the object in the service model, and to provide the status of the object when included in the service model and influencing the status of one or more other objects that depend on that object in the hierarchy of the service model.

18. The computer program product of claim 17, further comprising:

means for configuring said service management system for including new objects in said service model dynamically during runtime of said service management system.

19. The computer program product of claim 17, wherein the availability of said objects is represented in said service model by their status which is calculated based on messages and based on the status of other related objects of said service model.

20. The computer program product of claim 9, wherein said automatically processed data relating to an object that is not represented in said service model further comprises a means for collecting messages from said IT environment reporting the status of said object.

21. The computer program product of claim 20, wherein said automatically processed data relating to an object that is not represented in said service model further comprises a means for evaluating the status information from the messages from said IT environment.

22. The computer program product of claim 17, wherein, when an object that is not represented in said service model is included in said service model, the results of said automatically processed data are available for monitoring said object and for calculating the status of other depending objects of said service model such that only parts of said service model have to be recalculated.

23. The computer program product of claim 19, wherein the calculation of the status of an object that has been included in said service model does not require a time consuming access to previous messages reporting the status of said object.

24. The computer program product of claim 17, wherein said service model and the status of said objects of said service model are visualised in a graphical user interface.

25. The computer program product of claim 17, wherein objects and their dependencies between each other of at least a part of said IT environment are detected automatically within said IT environment.

* * * * *